US008634987B2

(12) United States Patent
Seta et al.

(10) Patent No.: US 8,634,987 B2
(45) Date of Patent: Jan. 21, 2014

(54) CONTROL APPARATUS FOR ELECTRIC VEHICLE

(75) Inventors: Itaru Seta, Tokyo (JP); Yosuke Ohtomo, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 839 days.

(21) Appl. No.: 12/711,587

(22) Filed: Feb. 24, 2010

(65) Prior Publication Data

US 2010/0235043 A1 Sep. 16, 2010

(30) Foreign Application Priority Data

Mar. 11, 2009 (JP) ................. 2009-058273

(51) Int. Cl.
*G06F 11/30* (2006.01)
*B60W 10/00* (2006.01)
*B60T 13/74* (2006.01)

(52) U.S. Cl.
USPC .......... 701/34.4; 701/22; 701/29.2; 701/34.3; 701/51; 477/71; 477/74; 477/92; 477/114; 477/120; 303/3; 303/11; 303/20; 303/155; 303/191; 903/915; 903/919; 903/947

(58) Field of Classification Search
USPC ......... 477/71, 74, 92–97, 114, 120, 171, 901; 701/22, 29.2, 29.7–29.9, 34, 51, 701/70–83; 303/3, 11, 20, 113.1–113.5, 303/116.1, 121–122.12, 155, 191; 903/915–919, 947; 192/215–219.1; 340/438, 453
See application file for complete search history.

(56) References Cited

U.S. PATENT DOCUMENTS

| 4,625,589 | A | * | 12/1986 | Nishikawa et al. | ............. 477/92 |
| 5,199,770 | A | * | 4/1993 | Yoshino et al. | .......... 303/122.03 |
| 5,692,990 | A | * | 12/1997 | Tsukamoto et al. | ............ 477/93 |
| 5,960,897 | A | * | 10/1999 | Furuya et al. | ............. 180/65.28 |
| 6,158,822 | A | * | 12/2000 | Shirai et al. | ................ 303/3 |
| 6,346,064 | B1 | * | 2/2002 | Hada et al. | .................. 477/171 |
| 6,388,407 | B1 | * | 5/2002 | Eguchi | ................... 318/376 |
| 6,524,217 | B1 | * | 2/2003 | Murakami et al. | ............... 477/5 |
| 2005/0017580 | A1 | * | 1/2005 | Cikanek et al. | ............ 303/191 |
| 2007/0215395 | A1 | * | 9/2007 | Ogata et al. | ............... 180/65.2 |

FOREIGN PATENT DOCUMENTS

JP  09-037415 A  2/1997

* cited by examiner

*Primary Examiner* — James Trammell
*Assistant Examiner* — Majdi Alsomiri
(74) *Attorney, Agent, or Firm* — McDermott Will & Emery LLP (57) ABSTRACT

A creep travel capability of an electric vehicle is secured when an abnormality occurs in a brake sensor. When an accelerator operation amount reaches 0% in a low vehicle speed region, a target creep torque is set, whereupon a motor-generator is controlled toward the target creep torque. The target creep torque is reduced as a brake pedal is depressed in order to suppress heat generation and the like in the motor-generator during vehicle braking. Hence, in an electric vehicle in which the target creep torque is varied in accordance with the brake operation amount, when an abnormality occurs (step S11) in a brake sensor for detecting a brake operation amount, a preset prescribed creep torque is employed as the target creep torque regardless of the brake operation amount (step S15). The prescribed creep torque is set at a required magnitude for securing the creep travel capability.

7 Claims, 13 Drawing Sheets

Fig. 13

CONTROL APPARATUS FOR ELECTRIC VEHICLE

CROSS-REFERENCE TO RELATED APPLICATIONS

The present application claims priority from Japanese Patent Application No. 2009-058273 filed on Mar. 11, 2009, and is hereby incorporated by reference in its entirety.

BACKGROUND OF THE INVENTION

1. Field of the Invention

The present invention relates to a control apparatus for an electric vehicle having an electric motor for driving vehicle wheels.

2. Description of the Related Art

An electric vehicle that generates a creep torque from an electric motor even when an accelerator pedal is not depressed has been proposed. The electric vehicle can perform creep travel similar to that of a vehicle including a torque converter, thereby facilitating driving operations in which start and stop operations are performed repeatedly. An electric vehicle in which the creep torque is increased and decreased in accordance with an operating condition of a brake pedal has also been proposed, as disclosed in Japanese Patent Application Laid-open (JP-A) No. 1997-37415, for example. In the electric vehicle described in JP-A No. 1997-37415, the creep torque is reduced when the brake is operated and increased when the brake is not operated. As a result, the creep torque can be generated even during a brake operation, thereby facilitating a driving operation in which the accelerator pedal and the brake pedal are depressed alternately during a hill start. Moreover, since the creep torque is reduced during a brake operation, vehicle braking is not affected by creep torque generation.

Incidentally, since the creep torque is increased and decreased in accordance with the brake operation, the electric vehicle is provided with a brake sensor for detecting a brake operation amount. However, when an abnormality occurs in the brake sensor, the brake operation amount cannot be grasped accurately, and therefore the creep torque cannot be controlled appropriately. When an appropriate creep torque cannot be obtained, a driver of the vehicle may experience an uncomfortable feeling, and in addition, creep travel may be impaired.

SUMMARY OF THE INVENTION

An object of the present invention is to secure a creep travel capability even when an abnormality occurs in a brake sensor.

A control apparatus for an electric vehicle according to the present invention is a control apparatus for an electric vehicle having an electric motor for driving vehicle wheels, a brake sensor for detecting a brake operation amount, and a vehicle speed sensor for detecting a vehicle speed, including: torque setting means for setting a target creep torque of the electric motor according to the brake operation amount and the vehicle speed; motor controlling means for drive-controlling the electric motor according to the target creep torque; and sensor abnormality detecting means for detecting an abnormality in the brake sensor, wherein, when an abnormality occurs in the brake sensor, the torque setting means sets the target creep torque at or above a predetermined value regardless of the brake operation amount.

The control apparatus for an electric vehicle according to the present invention further includes an acceleration sensor for detecting a vehicle acceleration, wherein the torque setting means changes the target creep torque set when an abnormality occurs in the brake sensor, based on the vehicle acceleration.

In the control apparatus for an electric vehicle according to the present invention, the torque setting means sets the target creep torque by multiplying a basic creep torque determined from the vehicle speed by a coefficient determined from the brake operation amount, and maintains the coefficient regardless of the brake operation amount when an abnormality occurs in the brake sensor.

In the control apparatus for an electric vehicle according to the present invention, the brake sensor changes an output signal within a predetermined range in accordance with the brake operation amount, and the sensor abnormality detecting means detects an abnormality in the brake sensor when the output signal from the brake sensor deviates from the predetermined range.

The control apparatus for an electric vehicle according to the present invention further includes an auxiliary brake sensor for detecting the brake operation amount, wherein the sensor abnormality detecting means detects an abnormality in the brake sensor by comparing an output signal from the brake sensor with an output signal from the auxiliary brake sensor.

The control apparatus for an electric vehicle according to the present invention further includes a brake switch for determining whether or not the brake operation amount exceeds a predetermined value, wherein the sensor abnormality detecting means detects an abnormality in the brake sensor by comparing an output signal from the brake sensor with an output signal from the brake switch.

The control apparatus for an electric vehicle according to the present invention further includes notifying means for notifying an occupant of the vehicle of an abnormality in the brake sensor.

According to the present invention, when an abnormality is detected in the brake sensor, the target creep torque is set at or above the predetermined value regardless of the brake operation amount, and therefore sufficient creep torque can be secured in the electric motor. As a result, a creep travel capability can be secured even when the brake operation amount cannot be grasped accurately.

DESCRIPTION OF THE PREFERRED EMBODIMENTS

Figure 1:
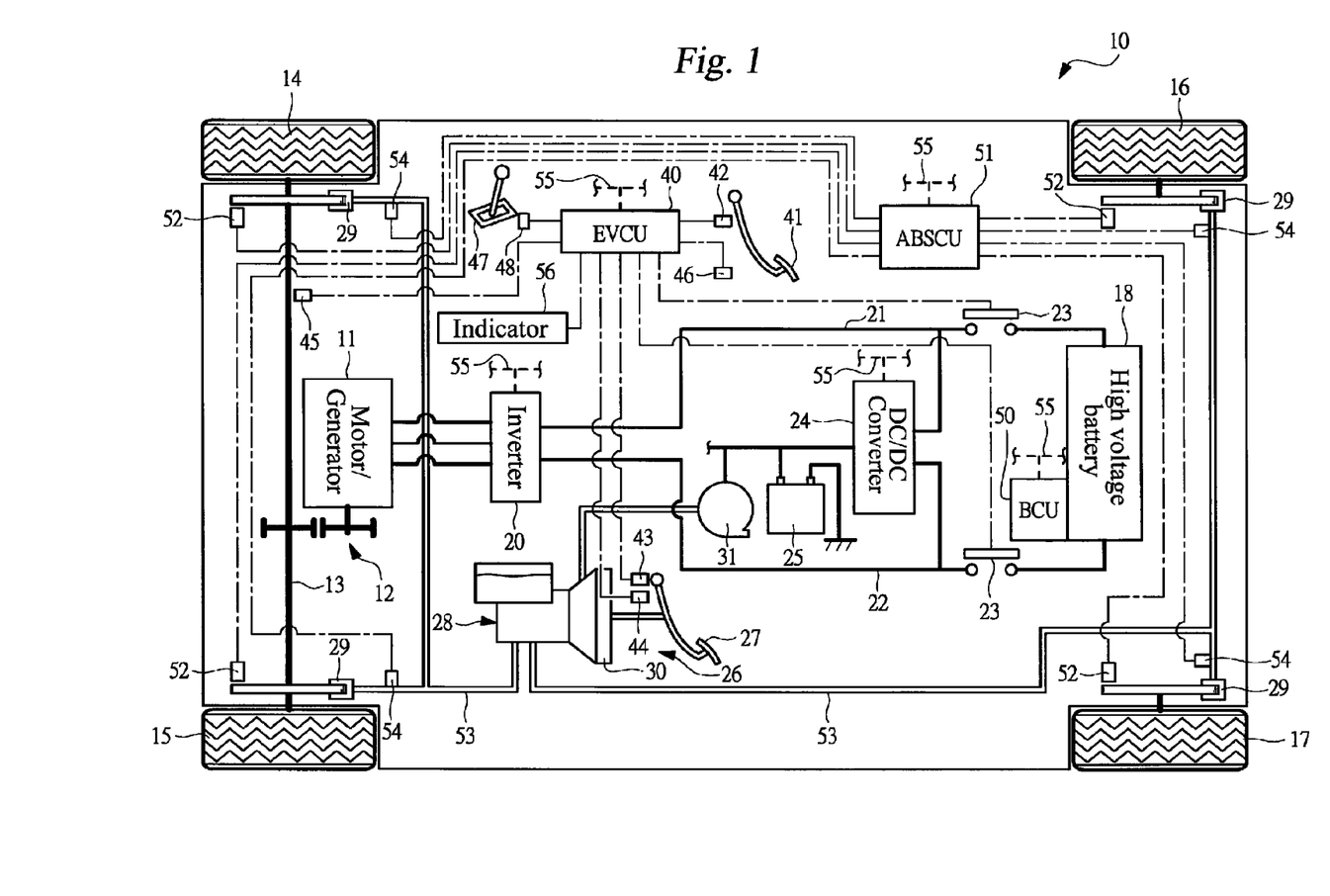
FIG. 1 is a schematic diagram showing the configuration of an electric vehicle.

An embodiment of the present invention will be described in detail below referring to the drawings. FIG. 1 is a schematic diagram showing the configuration of an electric vehicle 10. A control device for an electric vehicle serving as an embodiment of the present invention is applied to the electric vehicle 10. As shown in FIG. 1, the electric vehicle 10 includes a motor-generator (electric motor) 11 for driving vehicle wheels. A drive shaft 13 is coupled to the motor-generator 11 via a gear train 12, and vehicle wheels 14, 15 are coupled to the drive shaft 13. The electric vehicle 10 also includes a high voltage battery unit 18 that functions as a power supply of the motor-generator 11. A 400V lithium ion secondary battery, for example, is used in the high voltage battery unit 18.

An inverter 20 is connected to the motor-generator 11, and the high voltage battery unit 18 is connected to the inverter 20 via current carrying cables 21, 22. When the motor-generator 11 is driven as a motor, the inverter 20 converts a direct current from the high voltage battery unit 18 into an alternating current and supplies the alternating current to the motor-generator 11. When the motor-generator 11 is driven as a generator, on the other hand, the inverter 20 converts an alternating current from the motor-generator 11 into a direct current and supplies the direct current to the high voltage battery unit 18. By having the inverter 20 control a current value and a frequency of the alternating current, a torque and a rotation speed of the motor-generator 11 can be controlled. Note that the current carrying cables 21, 22 connected to the high voltage battery unit 18 are provided with a main relay 23.

A low voltage battery unit 25 is connected to the high voltage battery unit 18 via a DC-DC converter 24. A 12V lead battery, for example, is used in the low voltage battery unit 25. The low voltage battery unit 25 functions as a power supply for the inverter 20, the converter 24, and control units 40, 50, 51 to be described below, and also functions as a power supply for an air-conditioning device, headlights, and so on, not shown in the drawings. The electric vehicle 10 is further provided with a friction brake 26 for braking vehicle wheels 14 to 17. The friction brake 26 includes a master cylinder 28 that generates oil pressure in accordance with depression of a brake pedal 27 by a driver of the electric vehicle 10, and a caliper 29 that brakes the vehicle wheels 14 to 17 using the oil pressure from the master cylinder 28. Note that a vacuum booster 30 is attached to the master cylinder 28 and an electric vacuum pump 31 is connected to the vacuum booster 30.

Figure 2:
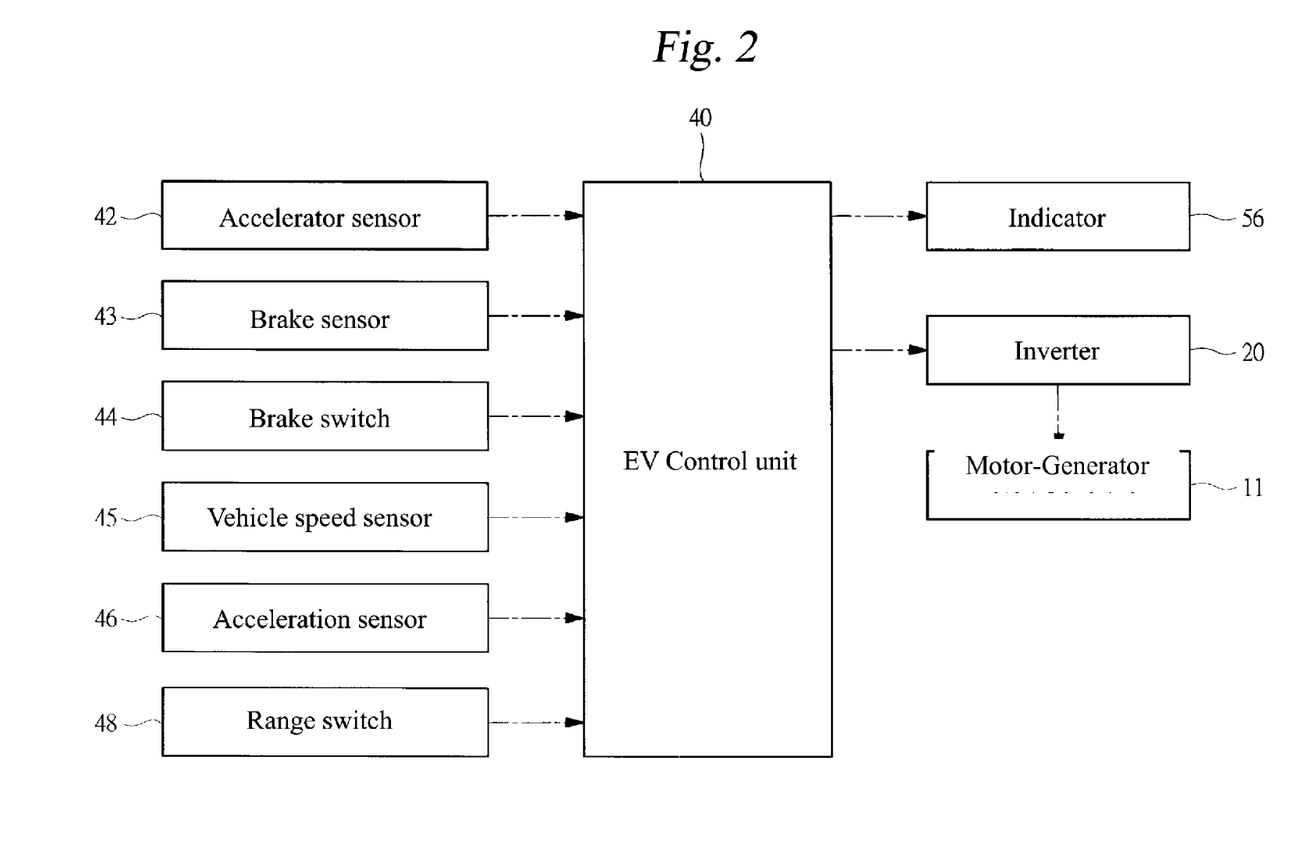
FIG. 2 is a block diagram showing connections between various elements and an EV control unit.

Further, the electric vehicle 10 is provided with an electric vehicle (EV) control unit (EVCU) 40 for performing overall control of the electric vehicle 10. FIG. 2 is a block diagram showing connections between the EV control unit 40 and various elements. As shown in FIGS. 1 and 2, an accelerator sensor 42 for detecting a depression amount (accelerator operation amount) of an accelerator pedal 41, a brake sensor 43 for detecting a depression amount (brake operation amount) of the brake pedal 27, a brake switch 44 for determining whether or not the brake pedal 27 has been depressed beyond a predetermined amount, a vehicle speed sensor 45 for detecting a vehicle speed, an acceleration sensor 46 for detecting a vehicle acceleration, a range switch 48 for detecting an operating position of a select lever 47, and so on are connected to the EV control unit 40.

Thus, various signals relating to the accelerator operation amount, brake operation amount, vehicle speed, vehicle acceleration, range position, and so on are input into the EV control unit 40. The EV control unit 40 sets a target torque and a target rotation speed of the motor-generator 11 based on the various input signals, and outputs a control signal to the inverter 20 based on these target values. In other words, the EV control unit 40 functions as torque setting means and motor controlling means.

As shown in FIG. 1, the electric vehicle 10 is provided with a battery control unit (BCU) 50 for controlling charging and discharging of the high voltage battery unit 18. Further, the electric vehicle 10 is provided with an antilock brake system control unit (ABSCU) 51 for controlling an activation state of the friction brake 26. A vehicle wheel speed sensor 52 for detecting a vehicle wheel speed and an oil pressure sensor 54 for detecting an oil pressure of a brake pipe 53 are connected to the antilock brake system control unit 51. Further, a communication network 55 is constructed in the electric vehicle 10, and the EV control unit 40, battery control unit 50, antilock brake system control unit 51, inverter 20, converter 24, and so on are connected to each other via the communication network 55.

Figure 3A:
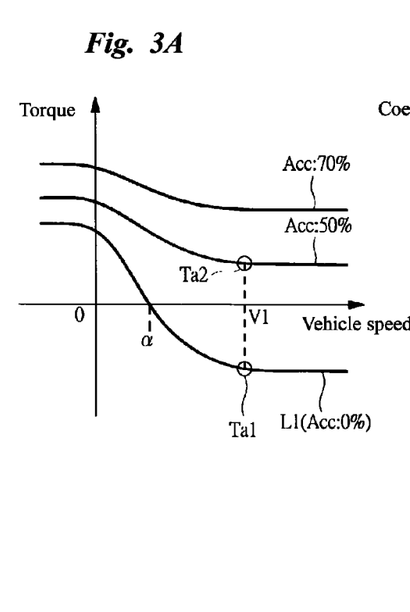
FIGS. 3A to 3C are schematic diagrams showing various maps used during torque control performed on a motor-generator.
Figure 3B:
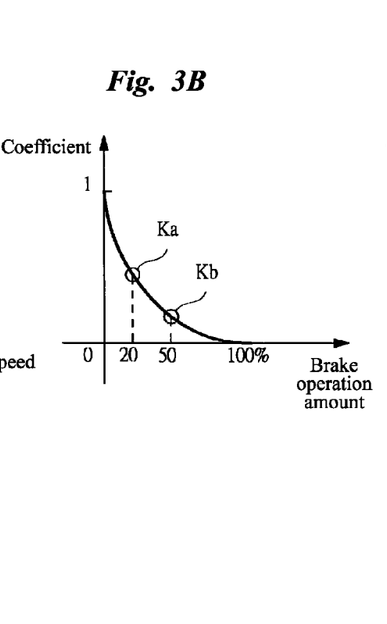
Figure 3C:
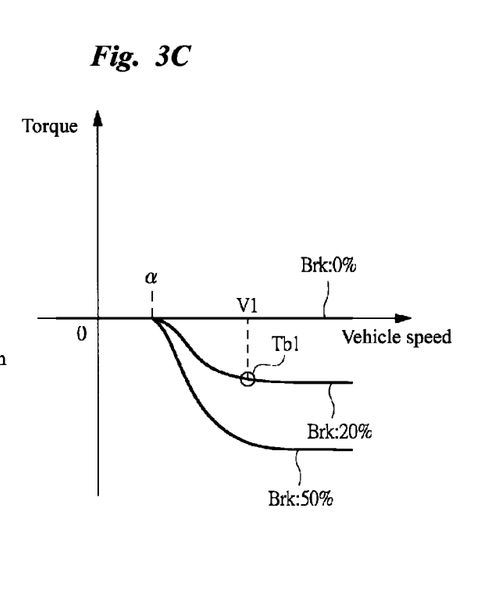

Next, torque control of the motor-generator 11 will be described in detail. FIGS. 3A to 3C are schematic diagrams showing various maps used in the torque control performed on the motor-generator 11. The EV control unit 40 sets a required torque based on an accelerator operation amount Acc and the vehicle speed by referring to a required torque map shown in FIG. 3A. Further, the EV control unit 40 sets a limiting coefficient (coefficient) based on a brake operation amount Brk by referring to a limiting coefficient map shown in FIG. 3B. Moreover, the EV control unit 40 sets a regenerative torque based on the brake operation amount Brk and the vehicle speed by referring to a regenerative torque map shown in FIG. 3C. The EV control unit 40 then calculates a corrected torque by multiplying the required torque by the limiting coefficient, and then determines a target torque of the motor-generator 11 by adding together the corrected torque and the regenerative torque.

Here, the required torque is set in accordance with the accelerator operation amount Acc at a torque for accelerating the electric vehicle 10 by controlling the motor-generator 11 to a motoring state. As shown in FIG. 3A, the required torque is set to increase when the accelerator pedal 41 is depressed and the accelerator operation amount Acc increases, and to decrease when the accelerator pedal 41 is released such that the accelerator operation amount Acc decreases. The regenerative torque is set in accordance with the brake operation amount Brk at a torque for decelerating the electric vehicle 10 by controlling the motor-generator 11 to a regenerative state. As shown in FIG. 3C, the regenerative torque is set to increase when the brake pedal 27 is depressed such that the brake operation amount Brk increases, and to decrease when the brake pedal 27 is released such that the brake operation amount Brk decreases.

Note that the accelerator operation amount Acc and brake operation amount Brk shown in FIG. 3 represent percentages of an actual pedal stroke of the accelerator pedal 41 and brake pedal 27 relative to an entire stroke of the respective pedals. More specifically, when the accelerator operation amount Acc is zero percent, this indicates that the accelerator pedal 41 is not depressed at all, and when the accelerator operation amount Acc is 100 percent, this indicates that the accelerator pedal 41 is fully depressed. Similarly, when the brake operation amount Brk is zero percent, this indicates that the brake pedal 27 is not depressed at all, and when the brake operation amount Brk is 100 percent, this indicates that the brake pedal 27 is fully depressed.

Figure 4A:
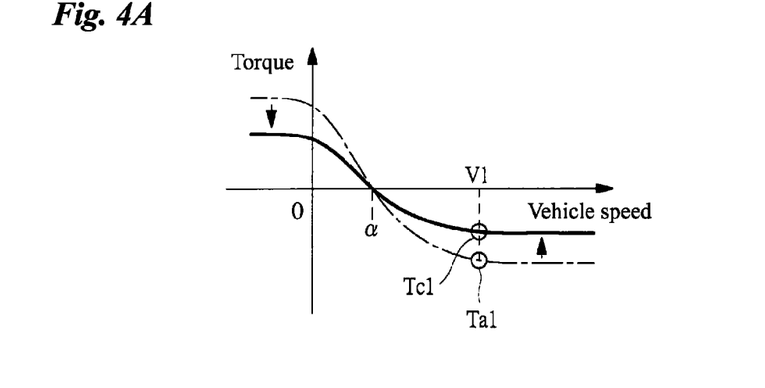
FIGS. 4A to 4C are illustrative views showing procedures performed when setting a target torque of the motor-generator.
Figure 4B:
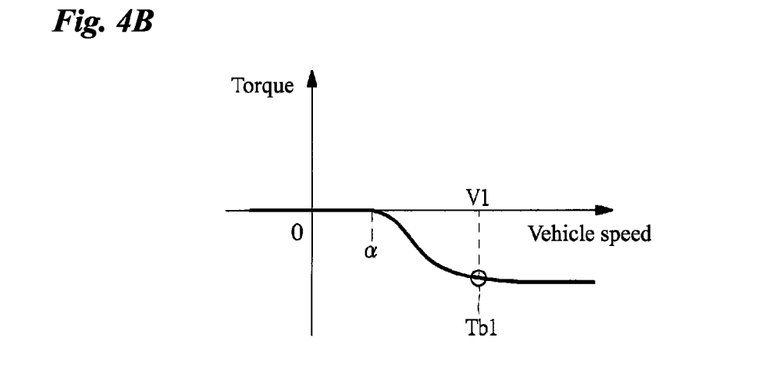
Figure 4C:
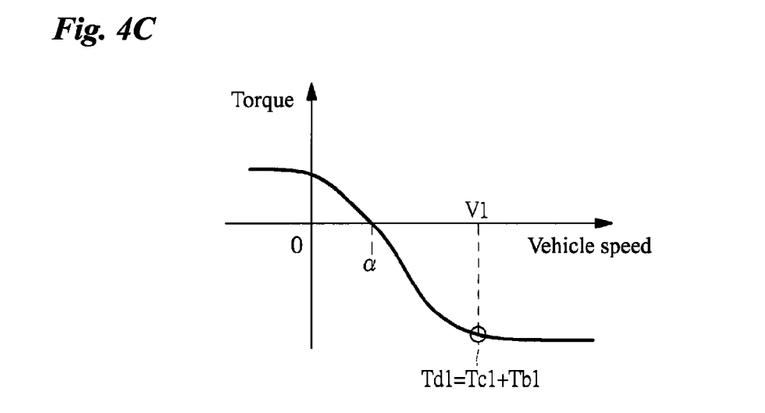
Figure 5A:
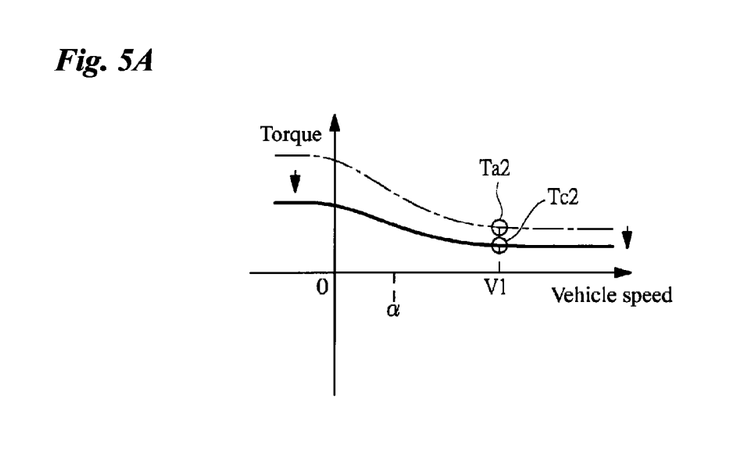
FIGS. 5A to 5C are illustrative views showing procedures performed when setting the target torque of the motor-generator.
Figure 5B:
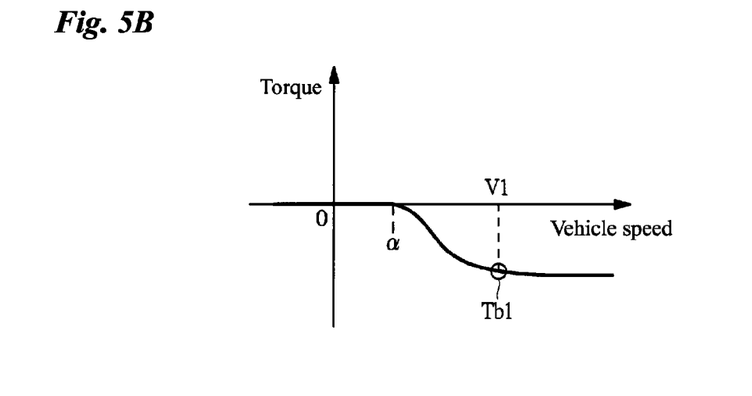
Figure 5C:
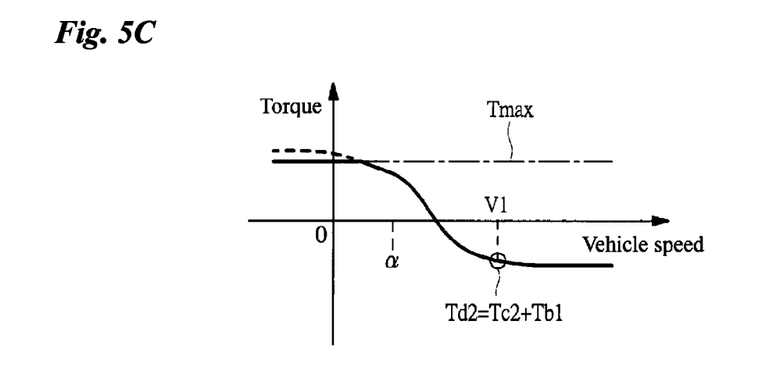

FIGS. 4 and 5 are illustrative views showing procedures performed to set the target torque of the motor-generator 11. FIGS. 4A to 4C are illustrative views showing a case in which the accelerator operation amount Acc is zero percent and the brake operation amount Brk is 20 percent, while FIGS. 5A to 5C are illustrative views showing a case in which the accelerator operation amount Acc is 50 percent and the brake operation amount Brk is 20 percent. It is assumed that the electric vehicle 10 is traveling at a vehicle speed V1.

Firstly, the case in which the accelerator operation amount Acc is zero percent and the brake operation amount Brk is 20 percent will be described. In this case, since the vehicle speed is V1 and the accelerator operation amount Acc is zero percent, Ta1 is set as the required torque according to the required torque map shown in FIG. 3A. Further, since the vehicle speed is V1 and the brake operation amount Brk is 20 percent, Tb1 is set as the regenerative torque according to the regenerative torque map shown in FIG. 3C. Furthermore, since the brake operation amount Brk is 20 percent, Ka is set as the limiting coefficient according to the limiting coefficient map shown in FIG. 3B. Next, as shown in FIG. 4A, Tc1 is calculated as the corrected torque by multiplying the required torque Ta1 by the limiting coefficient Ka to reduce the required torque Ta1. Next, Td1 is calculated as the target torque of the motor-generator 11 by adding together the corrected torque Tc1 and the regenerative torque Tb1.

Next, the case in which the accelerator operation amount Acc is 50 percent and the brake operation amount Brk is 20 percent will be described. In this case, since the vehicle speed is V1 and the accelerator operation amount Acc is 50 percent, Ta2 is set as the required torque according to the required torque map shown in FIG. 3A. Further, since the vehicle speed is V1 and the brake operation amount Brk is 20 percent, Tb1 is set as the regenerative torque according to the regenerative torque map shown in FIG. 3C. Furthermore, since the brake operation amount Brk is 20 percent, Ka is set as the limiting coefficient according to the limiting coefficient map shown in FIG. 3B. Next, as shown in FIG. 5A, Tc2 is calculated as the corrected torque by multiplying the required torque Ta2 by the limiting coefficient Ka to reduce the required torque Ta2. Next, Td2 is set as the target torque of the motor-generator 11 by adding together the corrected torque Tc2 and the regenerative torque Tb1. Here, when the brake pedal 27 is depressed beyond a predetermined amount such that an ON signal is output from the brake switch 44, an upper limit torque Tmax is set in relation to the motor-generator 11, as shown in FIG. 5C. The target torque is then limited to the upper limit torque Tmax.

By multiplying the required torque by the limiting coefficient to reduce the required torque when calculating the target torque of the motor-generator 11 in this manner, the target torque is reduced steadily as the brake pedal 27 is depressed. Hence, even when the accelerator pedal 41 is depressed while the friction brake 26 is activated such that the rotation of the motor-generator 11 is restricted, the target torque is reduced, and therefore excessive energization of the motor-generator 11 can be avoided. As a result, heat generation and power consumption in the motor-generator 11 can be suppressed. Furthermore, when the brake pedal 27 is depressed beyond the predetermined amount, the upper limit torque Tmax is set in relation to the target torque, as shown in FIG. 5C. As a result, the motor-generator 11 can be reliably protected.

Figure 6A:
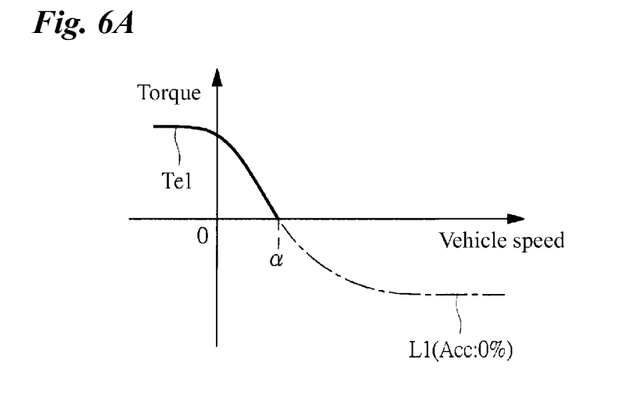
FIGS. 6A to 6C are illustrative views showing a setting condition of a target creep torque.
Figure 6B:
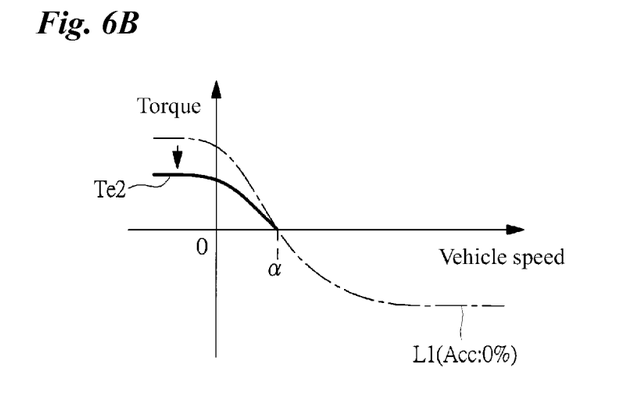
Figure 6C:
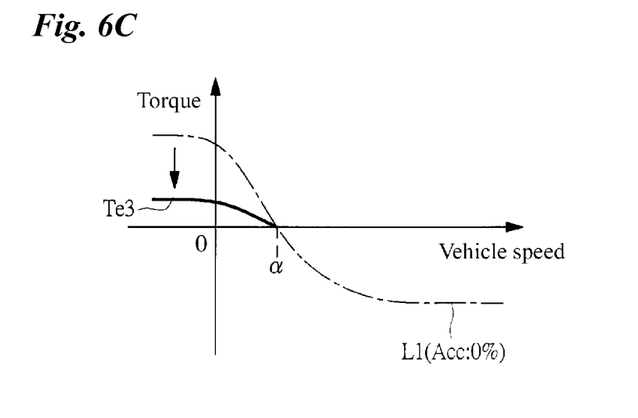

Incidentally, even when the accelerator pedal 41 is not depressed at all, as shown in FIG. 4C, or in other words even when the accelerator operation amount Acc is zero percent, a positive side target torque (to be referred to hereafter as a target creep torque) is set in a low vehicle speed range below a predetermined vehicle speed α (eight km/h, for example). As a result, a creep torque is output from the motor-generator 11 in the low vehicle speed range even when the accelerator pedal 41 is not depressed, and therefore a driving operation during startup is facilitated. FIGS. 6A to 6C are illustrative views showing a target creep torque setting condition. FIG. 6A is an illustrative view showing a case in which the brake operation amount Brk is zero percent. FIG. 6B is an illustrative view showing a case in which the brake operation amount Brk is 20 percent. FIG. 6C is an illustrative view showing a case in which the brake operation amount Brk is 50 percent.

Firstly, the creep torque is output when the accelerator pedal 41 is not depressed (Acc=0%), and therefore the required torque (to be referred to hereafter as a basic creep torque) is set based on a characteristic line L1 shown in FIG. 3A. In the low vehicle speed range where the creep torque is output, the regenerative torque is set at zero regardless of the brake operation amount Brk, as shown in FIG. 3C, and therefore the target creep torque matches a corrected torque obtained by multiplying the basic creep torque by a limiting coefficient. In other words, the target creep torque is calculated by determining a limiting coefficient based on the brake operation amount Brk and multiplying the basic creep torque by the limiting coefficient.

As shown in FIG. 3B, when the brake operation amount Brk is zero percent, the limiting coefficient is set to one. When the brake operation amount Brk is 20 percent, the limiting coefficient is set to Ka, which is smaller than one. When the brake operation amount Brk is 50 percent, the limiting coefficient is set to Kb, which is smaller than Ka. As shown in FIG. 6A, when the brake operation amount Brk is zero percent, a target creep torque Te1 that follows the characteristic line L1 is set by multiplying the basic creep torque following the characteristic line L1 by the limiting coefficient 1. Further, as shown in FIG. 6B, when the brake operation amount Brk is 20 percent, a target creep torque Te2 which is smaller than Te1 is set by multiplying the basic creep torque following the characteristic line L1 by the limiting coefficient Ka. Furthermore, as shown in FIG. 6C, when the brake operation amount Brk is 50 percent, a target creep torque Te3 which is smaller than Te2 is set by multiplying the basic creep torque following the characteristic line L1 by the limiting coefficient Kb.

Hence, the target creep torque is set in a similar manner to the target torque described above, and therefore the target creep torque decreases steadily as the brake pedal 27 is depressed. Hence, even when the rotation of the motor-generator 11 is halted by depressing the brake pedal 27 such that the friction brake 26 is activated, the target creep torque is reduced, and therefore unnecessary energization of the motor-generator 11 can be avoided. As a result, heat generation and power consumption in the motor-generator 11 can be suppressed. Furthermore, when the depressed brake pedal 27 is released, the creep torque gradually rises as the brake operation amount Brk decreases, and therefore a driving operation during a hill start or the like is considerably facilitated.

However, when an abnormality occurs in the brake sensor 43 for detecting the brake operation amount Brk, the brake operation amount Brk cannot be grasped accurately, and as a result, the creep torque cannot be adjusted to an appropriate amount. For example, when it is erroneously determined that the brake pedal 27 is depressed even though the brake pedal 27 has been released, it may be impossible to increase the creep torque. In this case, the creep torque required during startup cannot be obtained, and as a result, a driver of the electric vehicle 10 may experience an uncomfortable feeling. In particular, when the creep torque cannot be increased during a hill start, the electric vehicle 10 may reverse against an intention of the driver.

Therefore, in the electric vehicle 10, the EV control unit 40 is configured to function as sensor abnormality detecting means for detecting an abnormality in the brake sensor 43. When an abnormality is detected in the brake sensor 43, an occupant of electric vehicle 10 is notified thereof by displaying the abnormality in the brake sensor 43 on an indicator (notifying means) 56 shown in FIG. 2, and a minimum creep torque required for creep travel is secured according to a flowchart to be described below. Creep travel control executed in response to an abnormality in the brake sensor 43 will now be described.

Figure 7:
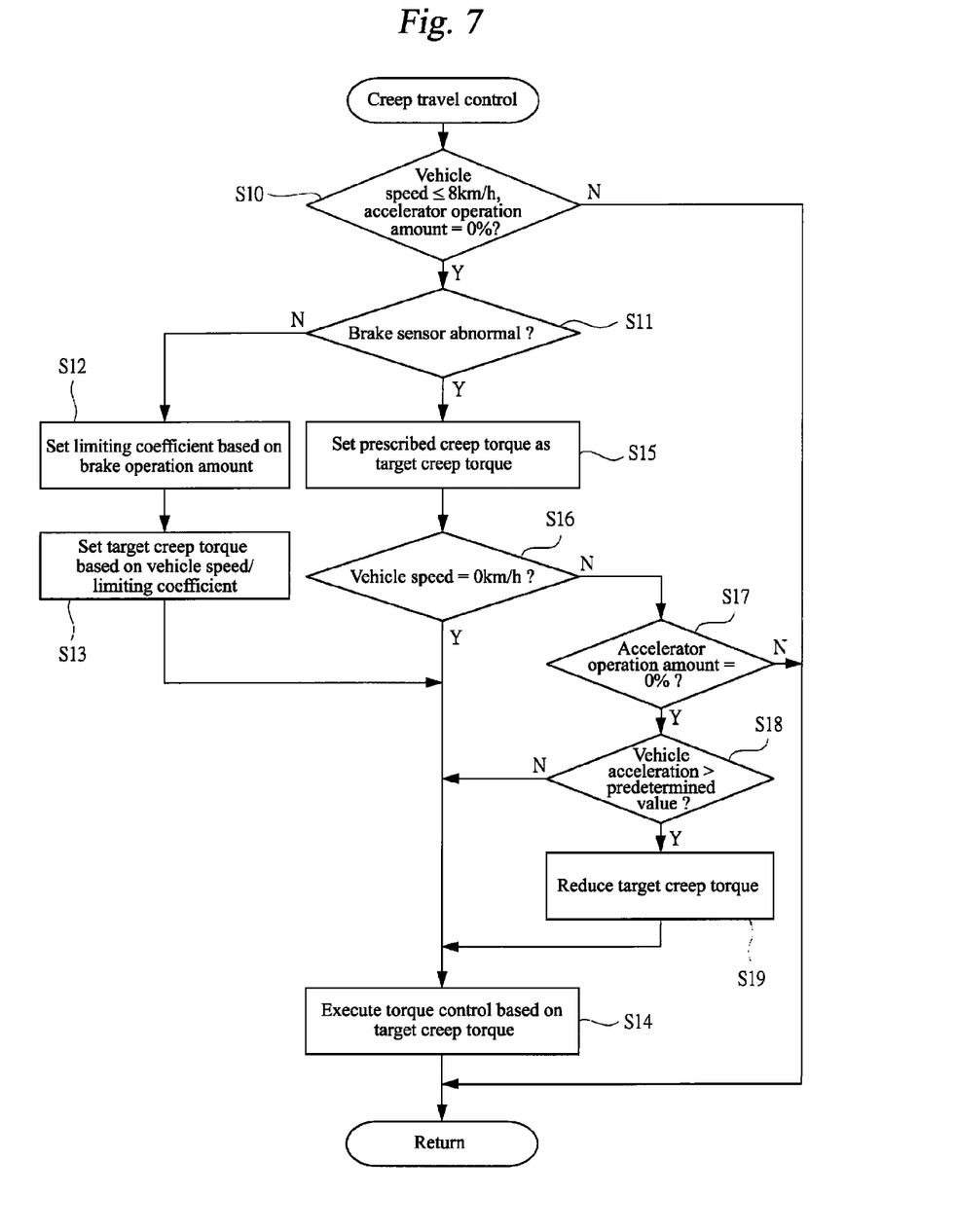
FIG. 7 is a flowchart showing an example of a procedure executed during creep travel control.

FIG. 7 is a flowchart showing an example of a procedure executed during creep travel control. As shown in FIG. 7, firstly, in a step S10, a determination is made as to whether or not the vehicle speed is no greater than eight km/h and the accelerator operation amount Acc is zero percent. In other words, a determination is made in the step S10 as to whether or not a creep travel condition is satisfied based on the vehicle speed and the accelerator operation amount Acc. When it is determined in the step S10 that the creep travel condition is not satisfied, the routine is exited with no further processing. When it is determined in the step S10 that the creep travel condition is satisfied, on the other hand, the routine advances to a step S11, in which a determination is made as to whether or not an abnormality has occurred in the brake sensor 43.

Figure 8:
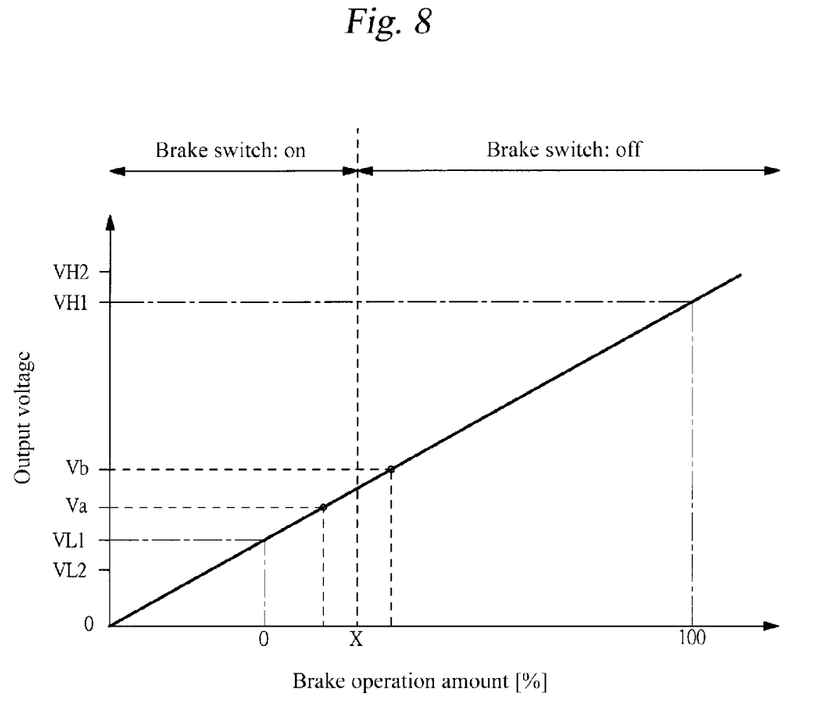
FIG. 8 is an illustrative view showing output voltage characteristics of a brake sensor.

FIG. 8 is an illustrative view showing an output voltage characteristic of the brake sensor 43. As shown in FIG. 8, in the brake sensor 43 incorporated into the brake pedal 27, an output voltage (output signal) varies within a predetermined range (VL1 to VH1) according to the brake operation amount Brk. The EV control unit 40 monitors the output voltage of the brake sensor 43, and when the output voltage falls below VL2, which is lower than VL1, or exceeds VH2, which is higher than VH1, the EV control unit 40 determines that an abnormality such as a disconnection, a ground short, or a voltage short has occurred in the brake sensor 43.

When, as a result of this procedure for detecting an abnormality in the brake sensor 43, the brake sensor 43 is determined to be normal in the step S11, the target creep torque is set according to the procedure described above. More specifically, as shown in FIG. 7, the limiting coefficient is set based on the brake operation amount Brk in a step S12, and the target creep torque is set based on the vehicle speed and the limiting coefficient in a following step S13. Torque control is then executed on the motor-generator 11 in a step S14 by outputting a control signal to the inverter 20 based on the set target creep torque.

Figure 9:
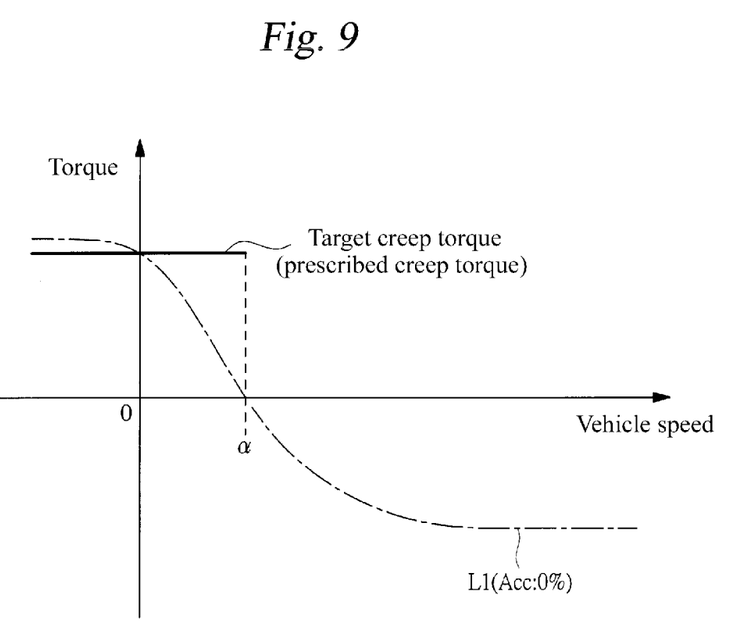
FIG. 9 is a diagram showing a target creep torque set in accordance with a prescribed creep torque.

On the other hand, when it is determined in the step S11 that an abnormality has occurred in the brake sensor 43, the routine advances to a step S15, in which a predetermined prescribed creep torque is set as the target creep torque. FIG. 9 is a diagram showing the target creep torque set according to the prescribed creep torque. As shown in FIG. 9, the prescribed creep torque is set at the same amount as the target creep torque when the brake operation amount Brk is zero and the vehicle speed is zero km/h. In other words, the prescribed creep torque is a same amount as the maximum target creep torque set during normal forward creep travel. By employing the prescribed creep torque as the target creep torque when an abnormality occurs in the brake sensor 43, the target creep torque is set at or above a predetermined value regardless of the brake operation amount Brk.

Once the prescribed creep torque has been set as the target creep torque in the step S15 of FIG. 7, the routine advances to a step S16, in which a determination is made as to whether or not the vehicle speed is zero km/h. When it is determined in the step S16 that the vehicle speed is zero km/h, the routine advances to the step S14, in which torque control is executed on the motor-generator 11 by outputting a control signal to the inverter 20 based on the target creep torque (the prescribed creep torque). When it is determined in the step S16 that the vehicle speed is not zero km/h, on the other hand, the routine advances to a step S17, in which a determination is made as to whether or not the accelerator operation amount Acc is zero percent. When it is determined in the step S17 that the accelerator operation amount Acc is not zero percent, or in other words that the driver has depressed the accelerator pedal 41, the creep travel control routine is exited to return normal travel control.

When it is determined in the step S17 that the accelerator operation amount Acc is zero percent, the routine advances to a step S18, in which a determination is made as to whether or not the vehicle acceleration exceeds a predetermined value. When it is determined in the step S18 that the vehicle acceleration is lower than the predetermined value, this indicates that the acceleration generated by the creep torque is insufficient, and therefore the routine advances to the step S14, in which torque control is executed on the motor-generator 11 by outputting a control signal to the inverter 20 based on the target creep torque (the prescribed creep torque). When the vehicle acceleration exceeds the predetermined value, on the other hand, this indicates that the acceleration generated by the creep torque is sufficient, and therefore the routine advances to a step S19, in which the target creep torque (the prescribed creep torque) is reduced. Torque control is then executed on the motor-generator 11 in the step S14 by outputting a control signal to the inverter 20 based on the target creep torque (the prescribed creep torque).

As shown in FIG. 9, when an abnormality is detected in the brake sensor 43, the prescribed creep torque, which is equal to or greater than a predetermined value, is employed as the target creep torque, and therefore sufficient creep torque can be reliably output from the motor-generator 11. As a result, the electric vehicle 10 can be prevented from reversing during a hill start or the like even when the brake sensor 43 is faulty, and therefore a creep travel capability can be secured. Moreover, when the vehicle acceleration exceeds a predetermined value, the target creep torque is reduced. Hence, even when the prescribed creep torque, which is rather large, is employed, creep travel can be implemented without causing the driver to experience an uncomfortable feeling.

Figure 10:
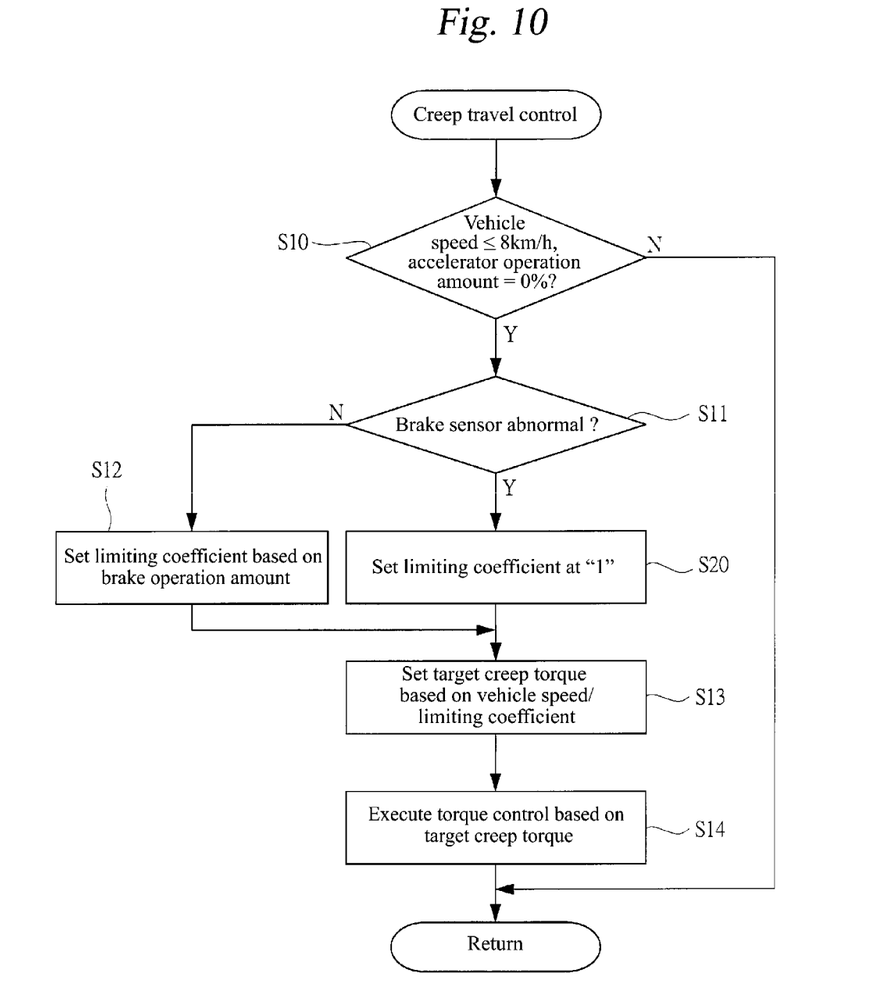
FIG. 10 is a flowchart showing another example of a procedure executed during creep travel control.
Figure 11:
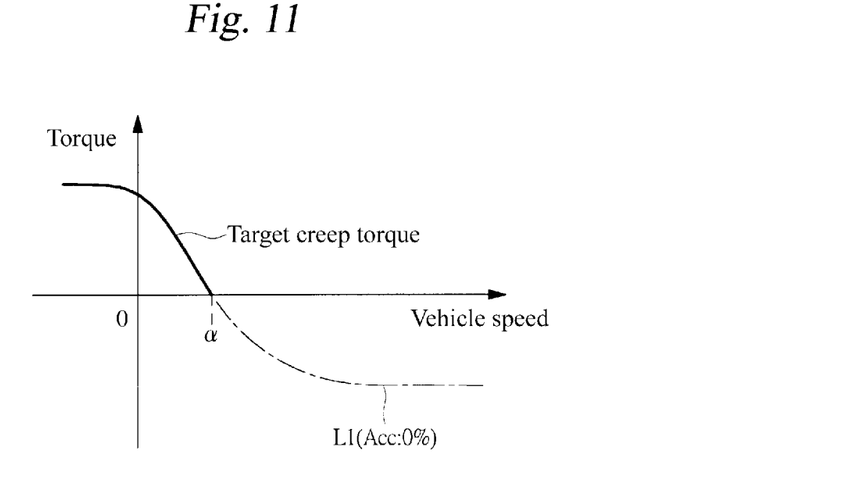
FIG. 11 is a diagram showing a target creep torque set by maintaining a limiting coefficient.

In the above description, the target creep torque is set at or above a predetermined value by employing the prescribed creep torque. However, the present invention is not limited to this configuration, and the target creep torque may be set at or above the predetermined value by fixing the limiting coefficient based on the brake operation amount Brk at one. FIG. 10 is a flowchart showing another example of a procedure executed during creep travel control. Note that in the flowchart of FIG. 10, identical steps to the steps shown in FIG. 7 have been allocated identical step numbers, and description thereof has been omitted. Further, FIG. 11 is a diagram showing a target creep torque set by fixing the limiting coefficient.

As shown in FIG. 10, when it is determined in the step S11 that an abnormality has occurred in the brake sensor 43, the routine advances to a step S20, in which the limiting coefficient is fixed at one regardless of the brake operation amount Brk. More specifically, as shown in FIG. 11, when an abnormality occurs in the brake sensor 43, the target creep torque is calculated according to the characteristic line L1 shown in FIG. 3A rather than being reduced based on the brake operation amount Brk. When the target creep torque is calculated with the limiting coefficient fixed at one in this manner, the target creep torque is set at or above a predetermined value that varies depending on the vehicle speed. As a result, the electric vehicle 10 can be prevented from reversing during a hill start or the like even when the brake sensor 43 is faulty, and therefore the creep travel capability can be secured. Moreover, since the limiting coefficient is fixed, the amount of the target creep torque can be varied based on the vehicle speed, and therefore creep travel can be implemented without causing the driver to experience an uncomfortable feeling.

In the above description, an abnormality in the brake sensor 43 is detected based on the output voltage from the brake sensor 43 alone. However, the present invention is not limited to this configuration, and an abnormality may be detected in the brake sensor 43 using another method. For example, as shown in FIG. 2, the electric vehicle 10 is provided with the brake switch 44 for determining whether or not the brake operation amount Brk exceeds a predetermined amount, and therefore an abnormality may be detected in the brake sensor 43 using an output signal from the brake switch 44. As shown in FIG. 8, an ON signal is output from the brake switch 44 when the brake operation amount Brk exceeds a predetermined value X. Accordingly, an abnormality may be detected in the brake sensor 43 by determining whether or not the output voltage from the brake sensor 43 has deviated from a predetermined range (Va to Vb) when the output signal from the brake switch 44 switches from an OFF signal to an ON signal.

Figure 12:
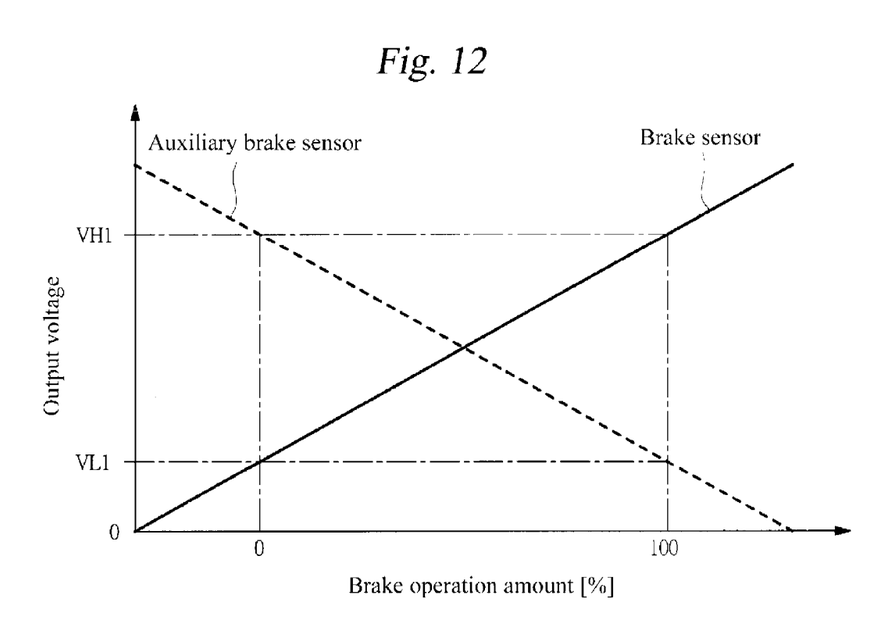
FIG. 12 is an illustrative view showing output voltage characteristics of the brake sensor and an auxiliary brake sensor.

Furthermore, by adding an auxiliary brake sensor that detects the brake operation amount Brk of the brake pedal 27, an abnormality in the brake sensor 43 may be detected based on the output voltage of the brake sensor 43 and an output voltage of the auxiliary brake sensor. FIG. 12 is an illustrative view showing output voltage characteristics of the brake sensor 43 and the auxiliary brake sensor. As shown in FIG. 12, when the brake operation amount Brk is zero percent, the output voltage of the brake sensor 43 corresponds to VL1 while the output voltage (output signal) of the auxiliary brake sensor corresponds to VH1. Further, when the brake operation amount Brk is 100 percent, the output voltage of the brake sensor 43 corresponds to VH1 while the output voltage of the auxiliary brake sensor corresponds to VL1. In other words, the brake sensor 43 has an output characteristic whereby the output voltage increases as the brake operation amount Brk increases, whereas the auxiliary brake sensor has an output characteristic whereby the output voltage decreases as the brake operation amount Brk increases. A value obtained by adding together the output voltages of the brake sensor 43 and auxiliary brake sensor having these output characteristics remains constant regardless of the brake operation amount Brk. Hence, an abnormality in the brake sensor 43 can be detected by determining whether or not a sum total value of the output voltages deviates from a predetermined range.

Figure 13:
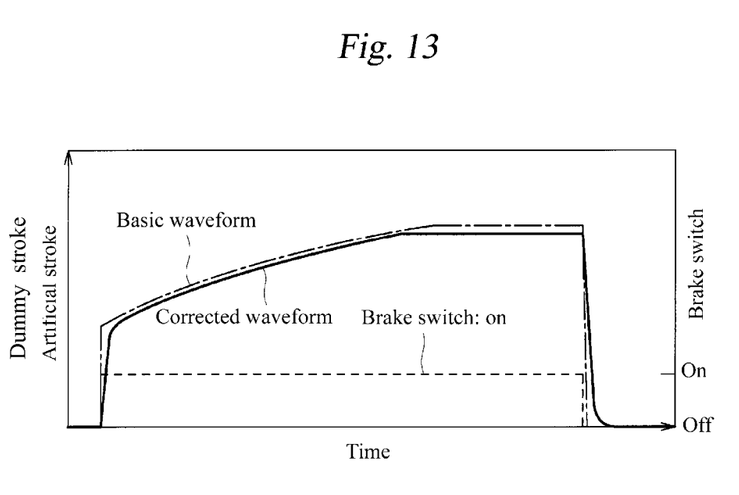
FIG. 13 is an illustrative view showing a dummy stroke.

Creep travel control executed when an abnormality occurs in the brake sensor 43 was described above. However, the limiting coefficient and regenerative torque are likewise set based on the brake operation amount Brk in the manner described above even when setting the target torque in a vehicle speed range exceeding the predetermined vehicle speed a (eight km/h, for example). Hence, when an abnormality occurs in the brake sensor 43 for detecting the brake operation amount Brk, the limiting coefficient and regenerative torque cannot be set appropriately, and as a result, a defect occurs in the travel performance of the electric vehicle 10. Therefore, the EV control unit 40 calculates a dummy brake operation amount Brk (to be referred to hereafter as a dummy stroke) from the ON signal and OFF signal output by the brake switch 44, and sets the limiting coefficient and regenerative torque using this dummy stroke. FIG. 13 is an illustrative view showing the dummy stroke. As shown in FIG. 13, when the ON signal is output from the brake switch 44, a basic waveform of the dummy stroke is raised by a fixed amount in a stepped fashion so that a favorable initial response is obtained. The basic waveform of the dummy stroke is then increased gradually to a preset maximum value at a long time constant in order to approach an actual brake pedal operation. When the OFF signal is output from the brake switch 44, the basic waveform of the dummy stroke is reduced to zero in a stepped fashion. The basic waveform of the dummy stroke is correctively smoothed by a low-pass filter of approximately one Hz, and then used as the brake operation amount Brk to set the target torque of the motor-generator 11.

The present invention is not limited to the embodiments described above, and may be subjected to various modifications within a scope that does not depart from the spirit thereof. For example, in the drawings, the present invention is applied to the electric vehicle 10 including only the motor-generator 11 as a power source. However, the present invention is not limited to this configuration, and may be applied to a hybrid electric vehicle having both the motor-generator 11 and an engine as power sources. Further, a sensor abnormality is displayed on the indicator 56 when an abnormality occurs in the brake sensor 43, but the present invention is not limited to this configuration, and instead, a warning sound may be emitted from a speaker serving as the notifying means when an abnormality occurs in the brake sensor 43.

Furthermore, in the above description, the prescribed creep torque having an identical amount to the target creep torque when the brake operation amount Brk is zero and the vehicle speed is zero km/h is used when an abnormality occurs in the brake sensor 43, but the present invention is not limited to this, and the prescribed creep torque may be set at another numerical value allowing minimal creep travel. Similarly, when an abnormality occurs in the brake sensor 43, the limiting coefficient is fixed at one, but the present invention is not limited to this, and the limiting coefficient may be fixed at another numerical value allowing minimal creep travel.

What is claimed is:

1. A control apparatus for an electric vehicle having an electric motor for driving vehicle wheels, a friction brake for braking vehicle wheels in accordance with depression of a brake pedal by a driver of the electric vehicle, a brake sensor for detecting a brake operation amount which represents a depression amount of the brake pedal, and a vehicle speed sensor for detecting a vehicle speed, comprising:

torque setting means for setting a target creep torque of said electric motor based on said brake operation amount and said vehicle speed;

motor controlling means for drive-controlling said electric motor based on said target creep torque; and sensor abnormality detecting means for detecting an abnormality in said brake sensor, wherein, when an abnormality occurs in said brake sensor, said torque setting means sets said target creep torque at or above a minimum creep torque required for creep travel regardless of said brake operation amount.

2. The control apparatus for an electric vehicle according to claim 1, further comprising an acceleration sensor for detecting a vehicle acceleration, wherein said torque setting means changes said target creep torque set when an abnormality occurs in said brake sensor, based on said vehicle acceleration.

3. The control apparatus for an electric vehicle according to claim 1, wherein said torque setting means sets said target creep torque by multiplying a basic creep torque determined from said vehicle speed by a coefficient determined from said brake operation amount by, and maintains said coefficient regardless of said brake operation amount when an abnormality occurs in said brake sensor.

4. The control apparatus for an electric vehicle according to claim 1, wherein said brake sensor changes an output signal within a predetermined range according to said brake operation amount, and said sensor abnormality detecting means detects an abnormality in said brake sensor when said output signal from said brake sensor deviates from said predetermined range.

5. The control apparatus for an electric vehicle according to claim 1, further comprising an auxiliary brake sensor for detecting said brake operation amount, wherein said sensor abnormality detecting means detects an abnormality in said brake sensor by comparing an output signal from said brake sensor with an output signal from said auxiliary brake sensor.

6. The control apparatus for an electric vehicle according to claim 1, further comprising a brake switch for determining whether or not said brake operation amount exceeds a predetermined value, wherein said sensor abnormality detecting means detects an abnormality in said brake sensor by comparing an output signal from said brake sensor with an output signal from said brake switch.

7. The control apparatus for an electric vehicle according to claim 1, further comprising notifying means for notifying an occupant of an abnormality in said brake sensor.

* * * * *